United States Patent [19]

Erway

[11] Patent Number: 5,195,758
[45] Date of Patent: Mar. 23, 1993

[54] THREE-PIECE OIL CONTROL RING ASSEMBLY

[75] Inventor: Parker K. Erway, Battle Creek, Mich.

[73] Assignee: Hastings Manufacturing Company, Hastings, Mich.

[21] Appl. No.: 794,571

[22] Filed: Nov. 19, 1991

[51] Int. Cl.$^5$ .............................................. F16J 9/06
[52] U.S. Cl. ...................... 277/140; 277/141; 277/216; 267/1.5
[58] Field of Search .............. 277/139, 140, 141, 142, 277/160, 216, 220; 267/1.5

[56] References Cited

U.S. PATENT DOCUMENTS

| | | | |
|---|---|---|---|
| 2,656,230 | 10/1963 | Phillips | 277/139 |
| 2,815,996 | 12/1957 | Phillips | 277/139 |
| 2,904,377 | 9/1959 | Endres et al. | 277/139 |
| 2,907,101 | 10/1959 | Hamm . | |
| 2,970,022 | 1/1961 | Anderson | 277/139 |
| 3,346,264 | 10/1967 | Hamm | 277/141 |
| 3,442,519 | 5/1969 | Hamm et al. | 277/140 |
| 3,663,030 | 5/1972 | Miyamoto | 277/140 |
| 3,814,444 | 6/1974 | Johnson et al. | 277/139 |
| 4,130,288 | 12/1978 | Nisper | 277/216 |
| 4,194,747 | 3/1980 | Nisper | 277/140 |
| 4,226,430 | 10/1980 | Nisper | 277/139 |
| 4,429,885 | 2/1984 | Chiba et al. | 267/1.5 X |
| 4,585,237 | 4/1986 | Koop | 277/139 |
| 5,052,698 | 10/1991 | Kimura | 277/216 X |
| 5,087,055 | 2/1992 | Ono et al. | 267/1.5 X |

FOREIGN PATENT DOCUMENTS

| | | | |
|---|---|---|---|
| 511623 | 4/1955 | Canada | 277/140 |
| 1267207 | 6/1961 | France | 277/139 |
| 356309 | 9/1961 | Switzerland | 277/139 |

OTHER PUBLICATIONS

Catalog sheet entitled "RIK Piston Ring".

Primary Examiner—William A. Cuchlinski, Jr.
Assistant Examiner—James K. Folker
Attorney, Agent, or Firm—Price, Heneveld, Cooper, DeWitt & Litton

[57] ABSTRACT

A three-piece oil control ring includes a pair of radially split, generally flat annular rails which are supported in an axially spaced relationship by an annular spacer-expander. The expander defines alternating, axially symmetrical and generally U-shaped loops or corrugations. Each loop includes a pair of legs joined to a pad. The pad has a stepped configuration in radial cross section and includes a raised, outer, generally flat portion which supports a rail and a lowered central or intermediate portion. Each loop includes an axially extending lug or tab. The central portion is formed with a dimple or depression which provides sufficient material during the forming operation to configure the lug with a circumferentially extending, elongated rail contact surface. The legs of each of the corrugations are substantially vertical, having an angle from vertical within the range of zero to thirteen degrees. The total length of the surface of the lugs or tabs in contact with one of the rails is greater than 38 percent of the total circumferential length of the spacer-expander.

22 Claims, 1 Drawing Sheet

THREE-PIECE OIL CONTROL RING ASSEMBLY

BACKGROUND OF THE INVENTION

The present invention relates to piston rings and, more particularly, to multiple-piece oil control rings.

Oil control rings are used in internal combustion engines to limit the flow of lubricant along the cylinder wall and into the combustion chamber. Excess amounts of lubricant are distributed onto the wall of the cylinder during engine operation to lubricate the pistons and cylinder wall, clean the cylinder wall, cool the cylinder wall and pistons and to increase the effectiveness of the seal between the piston rings and the cylinder wall. Oil control rings are necessary for acceptable oil economy and to control exhaust emissions.

Heretofore, a wide variety of piston ring configurations have been proposed for oil control purposes. The various proposals have included one-piece, two-piece and three-piece configurations. Each of the configurations typically includes an upper rail structure and an axially spaced lower rail structure, both of which engage the cylinder wall. Three-piece oil control rings include split or parted top and bottom rails and an annular spacer-expander which axially spaces the rails and biases them radially outward and into engagement with the cylinder wall. Examples of prior oil control rings may be found in U.S. Pat. No. 2,656,230 entitled PISTON RING ASSEMBLY AND ELEMENTS THEREOF, which issued on Oct. 20, 1953 to Phillips; U.S. Pat. No. 2,907,101 entitled METHOD OF PRODUCING A CONTINUOUS SPACER AND EXPANDER FOR PISTON RINGS, which issued on Oct. 6, 1959 to Hamm; U.S. Pat. No. 3,814,444 entitled LOW FRICTION PISTON RING, which issued on Jun. 4, 1974 to Johnson et al; and U.S. Pat. No. 4,194,747 entitled THREE-PIECE OIL CONTROL RING, which issued on Mar. 25, 1980 to Nisper.

One known type of spacer-expander used in a three-piece oil control ring is formed from a strip of steel as a series of alternating corrugations or loops. Each loop is generally symmetrical about an axial centerline. Each loop or corrugation includes a pair of angled legs joined to a pad portion. A tab or lug is formed along an inner circumference of the spacer-expander. The tab, which may be straight or angled, engages an inner circumferential surface of the split rail.

Secondary wear can occur at the interface between the inside diameter of the rail and the tab or lug that contacts the rail. Excessive wear at this interface or contact line may result in a loss of radial thrust or in so-called unitizing of the rail at the contact line. The wear, therefore, can result in a loss of oil control ring assembly function. Attempts to overcome this problem in the past have included chrome plating the inside diameter of the rail, chrome plating of the spacer-expander, nitriding or the use of alternate, more costly materials.

Current engine design has increased this secondary wear problem. Current internal combustion engines have been incorporating pistons with reduced ring groove width due to a reduction in overall piston height. With conventional corrugated spacer-expanders, a reduction in the overall height of the spacer-expander due to a reduction in the axial width of the groove reduces the length of the surface in contact with the rail. This reduction in contact length results in an increase of unit pressure. The increase in unit pressure exacerbates the secondary wear problem.

Other problems encountered with current oil control rings include localized groove side wear. This results from an increase in the pressure towards the sides of the piston ring groove at the radial position of the spacer gap. Problems have been experienced with conformation. Forming problems can cause the spacer to appear nonsymmetrical and, hence, have poor conformation or shape. In addition, the formation steps may produce a spacer-expander with unbalanced residual stresses resulting in inconsistency in part formation.

SUMMARY OF THE INVENTION

In accordance with the present invention, the aforementioned problems are substantially eliminated. Essentially, an oil control ring assembly is provided which includes an annular spacer-expander. The spacer-expander is configured to engage and support a pair of radially split, generally flat annular rails. The spacer-expander defines alternating, axially symmetrical and generally U-shaped loops or corrugations. Each loop includes a pair of legs joined to a pad and a circumferentially extending, radially inwardly positioned lug or tab. The pad has a stepped configuration including a raised, outer, generally flat portion and a lowered central or intermediate portion. The central portion is formed with a depression or dimple and is separated from the raised, flat portion and the lug by slits. Formation of the dimple provides sufficient material so that the lug may be formed as a circumferentially elongated portion with a significantly greater rail contact surface length than has heretofore been possible. The legs of the corrugations or loops are generally vertically oriented and positioned at an angle from vertical within the range of zero to thirteen degrees.

In narrower aspects of the invention, the spacer-expander is configured so that the ratio of pitch between adjacent corrugations to the length of the contact surface defined by each lug is less than 3.0 and preferably within the range of 1.9 to 2.6. The total length of the contact surface of the lugs in contact with one of the parted or split rails is greater than 38 percent of the total circumferential length of the spacer-expander. A significant reduction in unit pressure is achieved which eliminates or significantly reduces the aforementioned secondary wear problems.

Abutting ends of the spacer-expander are formed by upstanding, generally vertical end legs. The squaring up at the ends of the spacer-expander significantly reduces or eliminates axial side pressure on the piston groove sides. The formation of the spacer-expander with the depression or dimple in the pad area balances residual stresses during formation and improves conformation of the spacer-expander.

DETAILED DESCRIPTION OF THE PREFERRED EMBODIMENT

Figure 1:
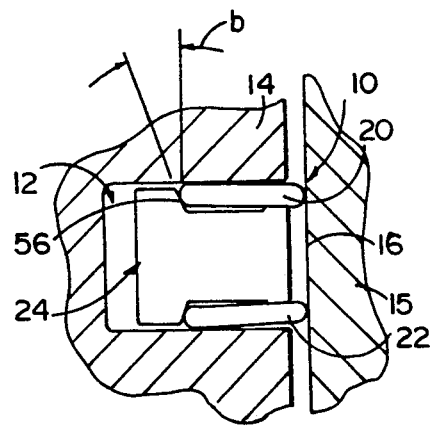
FIG. 1 is a fragmentary, cross-sectional view of a piston and cylinder showing an oil control ring assembly in accordance with the present invention.
Figure 2:
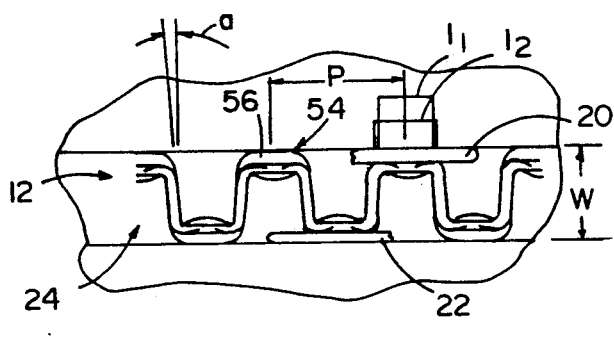
FIG. 2 is a front, fragmentary, elevational view of a piston and groove including a control ring assembly in accordance with the present invention.

A preferred embodiment of a multi-piece oil control ring assembly in accordance with the present invention is illustrated in FIGS. 1 and 2 and generally designated by the numeral 10. Assembly 10 is shown positioned in a groove 12 of a piston 14. As shown, piston 14 is disposed within a cylinder 15 of an internal combustion engine. Cylinder 15 includes a cylinder wall 16. Oil control ring assembly 10 includes a pair of radially split or parted rails or segments 20, 22 and a spacer-expander 24.

Rails 20, 22 are conventional radially split or parted annular members. The rails are generally flat or ribbon-like in configuration. Rails 20, 22 are biased into contact with cylinder wall 16 by spacer-expander 24. Spacer-expander 24 axially spaces and supports the rails 20, 22 and expands or exerts a radial thrust to the rails.

Figure 3:
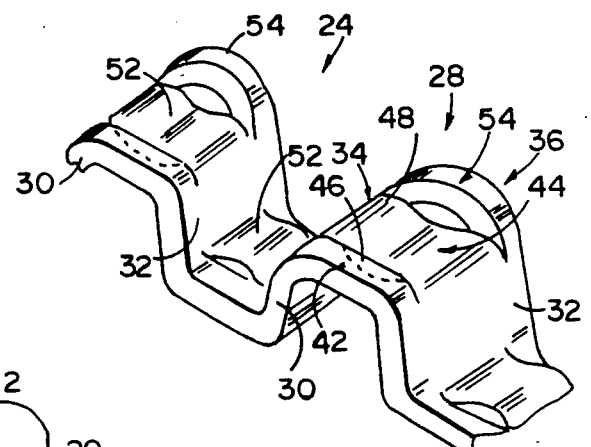
FIG. 3 is a fragmentary, enlarged, perspective view of a spacer-expander in accordance with the present invention.
Figure 4:
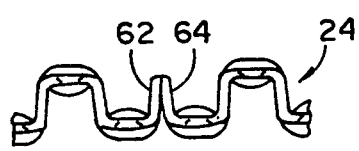
FIG. 4 is a fragmentary, elevational view of a spacer-expander in accordance with the present invention showing the abutting ends thereof.

Spacer-expander 24, as best seen in FIGS. 2, 3 and 4, is formed from an elongated steel strip into an annular ring shape. Spacer-expander 24 includes a series of alternating, axially symmetrical corrugations or loops 28. Each loop 28 is generally U-shaped in elevation and includes legs 30, 32, a pad or bight portion 34 and a lug or rail engaging tab 36. Pad portion 34 has a stepped configuration in radial cross section, as shown in FIG. 1. The pad includes a raised, flat outer portion 42 joined to legs 30, 32. The rails rest on or engage portion 42. In addition, pad 34 includes a central or intermediate portion 44 which is lowered with respect to portion 42. The strip material used to form spacer-expander 24 is slit circumferentially along lines or edges 46, 48. Central portion 44 defines a depression or dimple generally designated 52. Each loop or corrugation further includes a lug or tab 54 joined to legs 30, 32. Tab 54 defines a contact surface or line 56 which engages the radial inward face of a rail 20, 22. Depression 52, formed during the shaping of the spacer-expander, collects enough material at the corrugation so that it may be slit at line 48 and deformed to shape lug 54 as a circumferentially elongated, generally rectangular member. The configuration of the lug results in a substantially increased circumferential contact line than has heretofore been provided.

The intermediate pad portion also provides for improved oil drainage. As shown in FIG. 3, an opening or space is provided along the slit line with the lug and below the lug contact surface 56.

The lengthening of contact surface 56 is also achieved through the configuration of legs 30, 32. As shown in FIG. 2, legs 30, 32 form an angle "a" from vertical. In the preferred form, the angle "a" is within the range of zero degrees to thirteen degrees. Adjacent corrugations, as shown in FIG. 2, define a pitch "p", which is the distance between centers of adjacent pad portions. In addition, lug surface 56 assumes an angle "b" from vertical (FIG. 1). In the preferred form, the angle is twenty degrees. The angle may vary, however, from zero to twenty degrees.

As shown in FIG. 4, the ends of spacer-expander 24 are defined by upturned end legs 62, 64. End legs 62, 64 are substantially vertical in orientation and are moveable into an abutting relationship, as shown in FIG. 4. The squaring up of the ends of the spacer-expander 24 eliminates excessive and, hence, reduces actual side pressure on the groove sides. The ends or points of the spacer-expander are squared during the forming process. In the alternative, the ends or points could be ground to achieve the square configuration. Further, a combination of grinding and forming could be used. Expander 24 is smaller in diameter at the points or ends than at locations ninety degrees to the points. The expander has a generally apple shape in plan. This allows the points to hug the bottom of the piston groove while assembling the rails. This is important for automated assembly.

Figure 5:
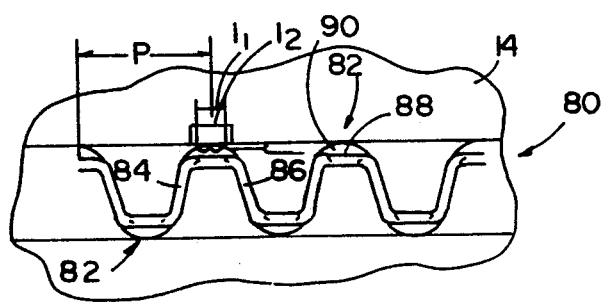
FIG. 5 is a front, elevational view of a piston and groove showing a prior art spacer-expander.

A prior art or conventional spacer-expander is illustrated in FIG. 5 and generally designated by the numeral 80. Spacer-expander 80 includes a series of alternating corrugations or loops 82. The loops are each defined by legs 84, 86. The loops are generally U-shaped in elevation and include pad or bight portions 88. The pad portions 88 of the conventional spacer-expander 80 may be stepped in cross section. The intermediate pad portion does not, however, include the dimple or depression of the present invention. In addition, each loop or corrugation 82 defines a rounded peak, tab or lug 90. The difference in the configuration between the prior art spacer-expander and that of the subject invention is readily noted by a comparison of FIGS. 2 and 5.

The Austenitic or work hardenable stainless steel from which the spacer-expander is formed is, of course, affected by the forming operation. When the standard cross section or prior art cross section of FIG. 5 is formed, radius corners are rendered hard in forming. The straighter sections at the pad have the material's initial hardness changed only slightly. In contrast, the dimple or depression in the top surface of the loop of the expander of the present invention produces a more even hardness.

In the prior expander, legs 84, 86 are angled more significantly from vertical. The lug of the prior expander has a rounded configuration and, hence, a significantly reduced contact line or surface when compared to the lugs of the subject invention. During the forming process of the spacer-expander of the current invention, rotary tools are used. The opposed tools form the U-shaped configuration, the depressions in the central pad and the slits. The depressions provide sufficient material so that the elongated lug 54 may be formed. Insufficient material is present at the lug area in the prior art to elongate the lug. Elongation without the depression would result in thinning and possible breakage of the lug at its point of joinder to the legs 30, 32.

The straightening of the legs and elongation of the contact surface results in a significant reduction in unit pressure on the rails 20, 22. The reduction in unit pressure substantially eliminates or alleviates secondary wear at the rail-to-lug interface. As shown in FIGS. 2 and 5, "p" designates pitch between adjacent lugs. The designation "$l_1$" designates the contact length at the lug-rail interface for an expander with a straight lug, that is, one which has an angle "b" of zero. The designation "$l_2$" designates the contact length at the lug-to-rail interface with a lug angle "b" of twenty degrees. Angling the lug increases the contact length. An angled lug biases rails 20, 22 into contact with the sides of the piston groove 12, as shown in FIG. 1. This increases the side sealing capability of the assembly.

The spacer-expander, in accordance with the present invention, may be fabricated from conventional materials such as type 201 Austenitic stainless steel or type 1070 carbon steel. A type 304 Austenitic stainless steel could be considered for more severe applications. This material is more costly, however, than the more conventional materials.

A comparison of contact length $l_1$ or $l_2$ to pitch "p" for different size spacer-expanders incorporating the spacer-expander of the present invention and the prior art spacer of FIG. 5 is set forth in the following Table 1. The percent improvement over the prior ring of FIG. 5 is given. The following Table 2 provides the ratio of pitch to contact length for each size. The control length percentage or total length of the contact surface or contact length of the lugs in contact with one of the rails as a percentage of the total circumferential length of the spacer-expander is provided in Table 2. The pitch value for each groove width "w" is the same in each table.

with the present invention is more readily adapted to different piston designs. The invention overcomes problems experienced by the trend towards reduced piston height and reduced piston groove dimensions.

In view of the above description, those of ordinary skill in the art may envision various modifications which would not depart from the inventive concepts disclosed herein. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows:

1. A spacer-expander for use with a pair of rails in a multi-piece oil control ring assembly, said spacer-expander comprising:
an annular member defining a plurality of alternating

TABLE 1

| PITCH | GROOVE WIDTH | LUG ANGLE | CONTACT LENGTH PER PITCH CONVENTIONAL | INVENTION | PERCENT IMPROVEMENT |
|---|---|---|---|---|---|
| 0.115 | 2 MM | 0 | .034 | .052 | 53 |
|  |  | 20 | .042 | .057 | 36 |
| 0.130 | 2.5 MM | 0 | .037 | .051 | 39 |
|  |  | 20 | .045 | .057 | 26 |
| 0.160 | 3 MM | 0 | .040 | .062 | 55 |
|  |  | 20 | .050 | .070 | 40 |
| 0.220 | 4 MM | 0 | .053 | .093 | 75 |
|  |  | 20 | .064 | .101 | 57 |

TABLE 2

| PITCH | LUG ANGLE | RATIO OF PITCH TO CONTACT LENGTH CONVENTIONAL | INVENTION | CONTACT LENGTH PERCENTAGE CONVENTIONAL | INVENTION |
|---|---|---|---|---|---|
| 0.115 | 0 | 3.382 | 2.2115 | 29.5% | 45.0% |
|  | 20 | 2.738 | 2.0175 | 36.5% | 49.5% |
| 0.130 | 0 | 3.513 | 2.5490 | 28.4% | 39.0% |
|  | 20 | 2.888 | 1.9400 | 34.6% | 43.8% |
| 0.160 | 0 | 4.000 | 2.5800 | 25.0% | 38.0% |
|  | 20 | 3.200 | 2.2850 | 31.2% | 43.7% |
| 0.220 | 0 | 4.150 | 2.3650 | 24.1% | 42.0% |
|  | 20 | 3.430 | 2.1780 | 29.0% | 45.9% |

The ratio of pitch to contact length varies within the range of approximately 2.2 to 2.6 when the angle "b" is zero degrees for a straight lug. The ratio varies within the range of approximately 1.9 to 2.3 when the angle "b" is twenty degrees for the present invention. Contact length percentage values of approximately 38 to 50 are achieved. Percent improvement of contact length per pitch values within the range of 26 to 75 percent are present for the different size spacer-expanders.

The configuration of the spacer-expander in accordance with the present invention results in a significant increase in contact length accompanied by a significant reduction in unit pressure. The spacer substantially reduces secondary wear at the lug-to-rail interface. The end configuration or point shape, as illustrated in FIG. 4, reduces and controls localized groove side wear. Conformation quality is improved. Forming problems are not as likely to cause the spacer to appear nonsymmetrical. The formation of the dimple or depression during the forming process also tends to balance the stresses in the spacer-expander at the form tooling radii. This balancing of residual stresses increases the consistency of subsequent forming operations. This eases manufacture and improves quality. The spacer-expander and three-piece oil control ring in accordance corrugations spaced around its periphery, said corrugations each defining:
a pad;
a pair of legs joined to radially extending edges of said pad; and
a raised lug joined to said legs and extending along the inner circumference of said member, said lug defining a rail contact surface, said legs extending at an angle "a" from vertical within the range of 0° to 13° and said pad having a stepped configuration in cross section and including a pair of radially spaced, circumferentially extending slits, an opening along one of the slits at the lug and below the lug contact surface for oil drainage and a central depression, said lug having a generally rectangular shape in front elevation and wherein the ratio of pitch between adjacent corrugations to the length of the contact surface of each lug is less than 2.70, and wherein said contact surface of said lug extends at an angle "b" from vertical, said angle "b" being in the range of zero to twenty degrees.

2. A spacer-expander as defined by claim 1 wherein the ratio of pitch to the length of the contact surface is within the range of approximately 2.2 to 2.6.

3. A spacer-expander as defined by claim 2 wherein the contact surface at said lug extends at an angle "b" from vertical of approximately zero degrees.

4. A spacer-expander as defined by claim 1 wherein the ratio of pitch to the length of the contact surface is within the range of approximately 1.9 to 2.3.

5. A spacer-expander as defined by claim 4 wherein the contact surface at said lug extends at an angle "b" from vertical of approximately twenty degrees.

6. A spacer-expander as defined by claim 1 wherein said annular member terminates in opposed ends, said ends defined by generally vertical end legs positionable in abutting relationship.

7. A spacer-expander as defined by claim 1 wherein said lugs define a total circumferential contact length within the range of approximately 38 percent to 50 percent of the total length of said annular member.

8. A spacer-expander as defined by claim 7 wherein said annular member terminates in opposed ends, said ends defined by generally vertical end legs positionable in abutting relationship.

9. A spacer-expander as defined by claim 8 wherein the ratio of pitch to the length of the contact surface is within the range of approximately 2.2 to 2.6.

10. A spacer-expander as defined by claim 9 wherein the contact surface at said lug extends at an angle "b" from vertical of approximately zero degrees.

11. A spacer-expander as defined by claim 8 wherein the ratio of pitch to the length of the contact surface is within the range of approximately 1.9 to 2.3.

12. A spacer-expander as defined by claim 11 wherein the contact surface at said lug extends at an angle "b" from vertical of approximately twenty degrees.

13. An oil control ring assembly comprising:
a pair of radially split, generally flat annular rails, said rails defining an inner circumferential surface; and
an annular spacer-expander engaging and supporting said rails in an axially spaced relationship, said expander defining alternating, axially symmetrical, generally U-shaped loops, each loop including a pair of legs joined to a pad, said pad having a stepped configuration in radial cross section and including a raised outer, generally flat portion and an intermediate portion, said intermediate portion defining a dimple and wherein said loops each include an axially extending lug joined to said legs, said lug defining an elongated rail contact surface, each of said loops including a pair of radially spaced slits separating said intermediate portion from said outer portion and said lug and wherein said dimple provides sufficient material during the formation of said spacer-expander so that the lug contact surface may be elongated within the deformation limits of the material from which the spacer-expander is formed and so that the total length of the contact surface of the lug which is in contact with one of said rails is greater than 38 percent of the total circumferential length of said spacer-expander and wherein the ratio of the pitch between adjacent loops to the length of the contact surface of each lug is less than about 2.70.

14. An oil control ring assembly as defined by claim 13 wherein said legs of said loops each extend at an angle "a" from vertical of approximately zero to thirteen degrees.

15. An oil control ring assembly as defined by claim 14 wherein said contact surface of said lug extends at an angle "b" from vertical, said angle "b" being in the range of zero to twenty degrees.

16. An oil control ring assembly as defined by claim 14 wherein the ratio of the pitch between adjacent loops to the length of the contact surface of each lug is within the range of 1.9 to 2.6.

17. An oil control ring assembly as defined by claim 15 wherein the ratio of pitch to the length of the contact surface is within the range of approximately 2.2 to 2.6.

18. An oil control ring assembly as defined by claim 17 wherein the contact surface at said lug extends at an angle "b" from vertical of approximately zero degrees.

19. An oil control ring assembly as defined by claim 15 wherein the ratio of pitch to the length of the contact surface is within the range of approximately 1.9 to 2.3.

20. An oil control ring assembly as defined by claim 19 wherein the contact surface at said lug extends at an angle "b" from vertical of approximately twenty degrees.

21. An oil control ring assembly as defined by claim 18 wherein said annular member terminates in opposed ends, said ends defined by generally vertical end legs positionable in abutting relationship.

22. An oil control ring assembly as defined by claim 20 wherein said annular member terminates in opposed ends, said ends defined by generally vertical end legs positionable in abutting relationship.

* * * * *